United States Patent
Hojoh

(10) Patent No.: US 11,181,430 B2
(45) Date of Patent: Nov. 23, 2021

(54) PRESSURE GAUGE

(71) Applicant: Q'z Corporation, Kodaira (JP)

(72) Inventor: Hisao Hojoh, Kodaira (JP)

(73) Assignee: Q'z Corporation, Kodaira (JP)

( * ) Notice: Subject to any disclaimer, the term of this patent is extended or adjusted under 35 U.S.C. 154(b) by 14 days.

(21) Appl. No.: 16/804,487

(22) Filed: Feb. 28, 2020

(65) Prior Publication Data

US 2020/0232861 A1 Jul. 23, 2020

Related U.S. Application Data

(63) Continuation of application No. PCT/JP2018/038643, filed on Oct. 17, 2018.

(51) Int. Cl.
*G01L 13/02* (2006.01)
*G01L 13/06* (2006.01)
*G01L 9/00* (2006.01)
*G01L 9/08* (2006.01)

(52) U.S. Cl.
CPC .......... *G01L 13/023* (2013.01); *G01L 9/0033* (2013.01); *G01L 9/08* (2013.01); *G01L 13/06* (2013.01)

(58) Field of Classification Search
CPC ......... G01L 13/023; G01L 13/06; G01L 9/08; G01L 9/0033; G01L 9/0013; G01L 9/0022; G01L 21/00
See application file for complete search history.

(56) References Cited

U.S. PATENT DOCUMENTS

| | | | | |
|---|---|---|---|---|
| 3,140,613 A | * | 7/1964 | Hasegawa | G01L 19/04 73/708 |
| 3,664,237 A | * | 5/1972 | Paros | G01L 13/023 92/38 |
| 3,672,220 A | * | 6/1972 | Agar | G01L 1/162 73/704 |
| 3,677,218 A | * | 7/1972 | Dixon | G01L 9/0033 116/272 |
| 3,783,693 A | * | 1/1974 | Paros | G01L 7/061 73/701 |

(Continued)

FOREIGN PATENT DOCUMENTS

WO 2018/127987 A1 7/2018

*Primary Examiner* — Alexander A Mercado
(74) *Attorney, Agent, or Firm* — Burr & Brown, PLLC

(57) ABSTRACT

A pressure gauge includes: an outer container defining an outer chamber set to a reference pressure (Pr); an inner container disposed in the outer container; and a tube setting the inside of a first inner chamber of the inner container to a measurement pressure (Px). The inner container includes: a cylindrical rigid wall portion; first and second pressure receiving plates that displace due to a differential pressure between the reference pressure and the measurement pressure; a bellows partitioning the inner container into the first inner chamber and a second inner chamber; and a pressure detection element disposed in the second inner chamber and detecting the measurement pressure based on the displacements of the first and the second pressure receiving plates. The outer chamber and the second inner chamber are set to the reference pressure of a high vacuum that is lower than a lower limit of the measurement pressure.

10 Claims, 8 Drawing Sheets

(56) References Cited

U.S. PATENT DOCUMENTS

| | | | | |
|---|---|---|---|---|
| 3,841,158 A * | 10/1974 | Hunter | G01L 13/023 | 73/721 |
| 4,091,682 A * | 5/1978 | Abbott | G01L 9/0022 | 73/702 |
| 4,382,385 A * | 5/1983 | Paros | G01L 9/0022 | 73/702 |
| 4,663,965 A * | 5/1987 | Metcalf | G01M 3/3272 | 73/49.3 |
| 4,680,970 A * | 7/1987 | Ueda | G01L 9/0016 | 73/702 |
| 4,778,159 A * | 10/1988 | Cooper | F16F 1/32 | 267/151 |
| 4,878,385 A * | 11/1989 | Lloyd | G01F 1/383 | 73/704 |
| 5,457,999 A * | 10/1995 | Feldman | G01L 9/0013 | 73/704 |
| 2008/0307885 A1* | 12/2008 | Ravitch | G01H 5/00 | 73/597 |
| 2009/0241679 A1* | 10/2009 | Motoyama | G01L 9/008 | 73/717 |
| 2009/0308164 A1* | 12/2009 | Motoyama | G01L 9/0008 | 73/702 |
| 2010/0224003 A1* | 9/2010 | Watanabe | G01L 13/025 | 73/717 |
| 2012/0031189 A1* | 2/2012 | Sato | G01L 9/085 | 73/717 |
| 2015/0260594 A1* | 9/2015 | Montoya | G01L 9/008 | 73/702 |
| 2015/0300841 A1* | 10/2015 | Campbell | G01B 7/14 | 417/410.1 |
| 2019/0107458 A1 | 4/2019 | Hojoh | | |

* cited by examiner

PRESSURE GAUGE

This application is a continuation of International Patent Application No. PCT/JP2018/038643, having an international filing date of Oct. 17, 2018, which designated the United States, the entirety of which is incorporated herein by reference.

FIELD OF THE INVENTION

The present disclosure relates to a pressure gauge capable of measuring a pressure ranging from the atmosphere to a vacuum.

BACKGROUND OF THE INVENTION

The present inventor has proposed a pressure gauge capable of accurately measuring the degree of a vacuum while suppressing influence of the external temperature change (Internal Publication No. WO 2018/127987). This patent document discloses that, excluding one surface side of a diaphragm in contact with a gas to be measured, the other surface side of the diaphragm, a piezoelectric element, and an internal structural body supporting them are covered by a reference pressure chamber. With this configuration, a high vacuum in the reference pressure chamber is also used as a vacuum heat insulating part, and convective heat transfer is suppressed by the vacuum heat insulating part, to thereby reduce the influence due to the temperature change which is the largest factor of errors of the pressure gauge.

Although the influence due to the temperature change is sufficiently reduced by the vacuum heat insulation, new problems to be solved arise, such as those for improvement of sensitivity, downsizing, errors due to the mounting postures, and contamination due to the gas, etc.

An object of the present disclosure is to provide a pressure gauge capable of solving new problems such as those for improvement of sensitivity, downsizing, errors due to mounting postures, and contamination due to a film forming gas, while reducing influence of temperature change.

Figure 1:
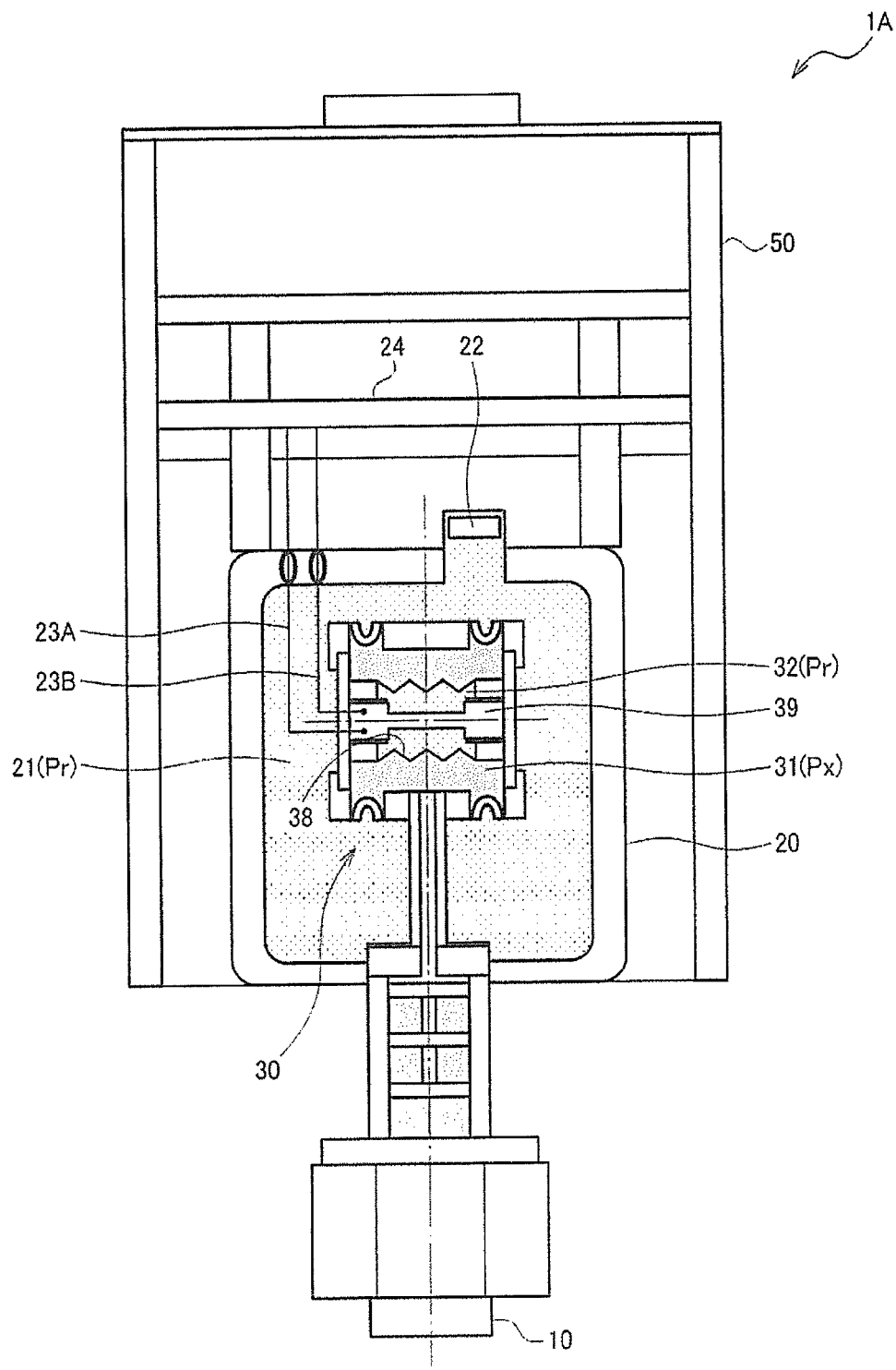
FIG. 1 is a sectional view of a pressure gauge according to a first embodiment of the present disclosure.

DETAILED DESCRIPTION OF THE INVENTION (1) In accordance with one of some embodiments, there is provided a pressure gauge comprising:
    an outer container defining an outer chamber set to a reference pressure;
    an inner container partitioning an inner chamber disposed in the outer container into a first inner chamber airtightly partitioned from the outer chamber and into a second inner chamber communicating with the outer chamber; and
    a tube setting the first inner chamber to a measurement pressure,
    the inner chamber including:
    a cylindrical rigid wall portion;
    first and second pressure receiving plates formed as opposing wall portions of the inner container and displaced due to a differential pressure between the reference pressure and the measurement pressure;
    a bellows disposed in the inner chamber surrounded by the cylindrical rigid wall portion and the first and the second pressure receiving plates so as to partition the inner chamber into the first inner chamber and into the second inner chamber, the bellows being deformable to allow displacements of the first and the second pressure plates; and
    a pressure detection element disposed in the second inner chamber and detecting the measurement pressure based on the displacements of the first and the second pressure receiving plates,
    the outer chamber and the second inner chamber being set to the reference pressure of a high vacuum that is lower than a lower limit of the measurement pressure.

According to one aspect of the present disclosure, the outer chamber and the second inner chamber both set to the reference pressure are also used as a vacuum heat insulating part with a high vacuum to suppress the convective heat transfer by the vacuum heat insulation, and whereby it is possible to reduce influence due to the temperature change which is the largest factor of errors of the pressure gauge. As the differential pressure between the reference pressure and the measurement pressure is changed, the first and the second pressure receiving plates are both displaced. Since the displacements of the first and the second pressure receiving plates have the same absolute value and of opposite sign, the displacement becomes doubled even if the individual displacements are small; thus the sensitivity can be doubled. Accordingly, the resolution can also be doubled. Alternatively, if the pressure sensitivity is constant, by increasing the thicknesses of the first and the second pressure receiving plates, it is possible to minimize drifting of the origin point due to decrease in stress. In addition, since the first and the second pressure receiving plates have small amount of displacement, they need only relatively small areas, so that size reduction of the pressure gauge can be attained. Moreover, when the pressure gauge is mounted while the first and the second pressure receiving plates are in horizontal postures, the first and the second pressure receiving plates bend in the same direction due to their own weights, so that the displacement due to their own weights is canceled and no measurement errors occur. Even when the film forming gas is introduced into the first inner chamber and the measurement pressure is set, the films are formed evenly on the first and the second pressure receiving plates; thus, the displacement caused by the change in the own weights of the first and the second pressure receiving plates due to film formation is canceled and no measurement errors occur. Furthermore, since the first and the second pressure receiving plates each having a small amount of displacement can be formed relatively thick, it is possible to suppress warping of the first and the second pressure receiving plates caused by internal stress due to film formation.

(2) In accordance with one of some embodiments, the pressure gauge according to the aspect (1) may further comprise:

a first rigid body portion that connects the first pressure receiving plate to the bellows; and a second rigid body portion that connects the second pressure receiving plate to the bellows, wherein:

one end of the pressure detection element may be fixed to the first rigid body portion and the other end of the pressure detection element is fixed to the second rigid body portion; and each of the first and the second rigid body portions may have an opening that allows the second inner chamber to communicate with the outer chamber. With this configuration, the bellows is connected to the first and the second pressure receiving plates via the first and the second rigid body portions, and thus assemblability of the pressure gauge is improved compared with one in which the bellows is directly connected to the first and the second pressure receiving plates. Moreover, the second inner chamber in the bellows and the outer chamber in the outer container can be allowed to communicate with each other via the openings formed respectively in the first and the second rigid body portions, to thereby set the insides of the both chambers to the reference pressure.

(3) In accordance with one of some embodiments, there is provided the pressure gauge according to the aspect (2), wherein the one end of the pressure detection element may be fixed to the opening of the first rigid body portion, and the other end of the pressure detection element may be fixed to the opening of the second rigid body portion. With this configuration, since the pressure detection element is fixed to each of the openings of the first and the second rigid body portions, the assemblability of the pressure gauge is improved compared with the case of fixing the pressure detection element directly to the first and the second pressure receiving plates. In addition, the both ends of the pressure detection element can be easily connected to the first and the second rigid wall portions, using the openings formed in the first and the second rigid body portions for the purpose of setting the reference pressure.

(4) In accordance with one of some embodiments, there is provided the pressure gauge according to any one of embodiments (1) to (3), wherein the pressure detection element may be a piezoelectric element. As the piezoelectric element, preferably a crystal resonator, and more preferably a double tuning fork crystal resonator can be used.

(5) In accordance with one of some embodiments, there is provided the pressure gauge according to the aspect (4), wherein a tensile force may act on the piezoelectric element when the measurement pressure is at the lower limit. With this configuration, even if the differential pressure between the reference pressure and the measurement pressure becomes relatively small, the displacement of the piezoelectric element due to the own weight of the bellows or the like can be prevented, and thus occurrence of measurement errors due to this displacement can be prevented. Thereby, the pressure-displacement characteristics become linear over a wide pressure range. Therefore, the versatility that the measurement can be performed over a wide pressure range using a single pressure gauge is increased. Moreover, it is possible to suppress necessity of correction while carrying out the measurement over a wide pressure range with a single pressure gauge.

(6) In accordance with one of some embodiments, the pressure gauge according to any one of embodiments (1) to (5) may further comprise elastically deformable first and second connecting members that air-tightly connect the first and the second pressure receiving plates to the rigid wall portion. With this configuration, free displacements of the first and the second receiving plates based on the differential pressure between the reference pressure and the measurement pressure can also be ensured by the elastic deformation of the first and the second connecting members. In particular, when the areas of the first and the second pressure receiving plates are small, it is useful to provide the first and the second connecting members.

(7) In accordance with one of some embodiments, there is provided the pressure gauge according to the aspect (6), wherein an elastic coefficient of each of the first and the second connecting members may be larger than an elastic coefficient of the bellows. Since the bellows expands and contracts in accordance with the free displacements of the first and the second pressure receiving plates based on the differential pressure between the reference pressure and the measurement pressure, the bellows may have a sufficiently smaller elastic coefficient than those of the first and the second connecting members.

(8) In accordance with one of some embodiments, there is provided the pressure gauge according to the aspect (7), wherein each of the first and the second connecting members may have a ring-shaped member having a U-shaped cross section. Each of the first and the second connecting members only need to have a smaller displacement than the maximum displacement of each of the first and the second pressure receiving plates, and has a relatively large elastic coefficient. Therefore, each of the first and the second connecting members may be formed to have a cross section in a single wave of the multiple waves of the cross section of the general bellows, that is, may be formed to be a ring-shaped member having a U-shaped cross section. Thereby, the pressure gauge can be reduced in size.

(9) In accordance with one of some embodiments, there is provided the pressure gauge according to any one of embodiments (1) to (8), wherein the reference pressure may be a high vacuum of $1/1000$ or less, preferably a high vacuum of $1/10000$ or less of a lower limit of the measurement pressure. With this configuration, the pressure can be measured with a high accuracy of 0.1% or less without being influenced by the reference pressure, and the function as the vacuum heat insulating part by the reference pressure can be further enhanced.

(10) In accordance with one of some embodiments, there is provided the pressure gauge according to any one of embodiments (1) to (9), wherein one of the tube and the inner container that are disposed in the outer container may be provided with a heater. With this configuration, for example, when a film forming gas is introduced and the measurement pressure is set, the temperature can be increased to a temperature at which the film formation by the film forming gas is suppressed. Thereby, even if contacting with film forming gas, it is possible to control the film formation to the inner container. In particular, the inner container that is vacuum insulated by the reference pressure in the outer container can be increased in temperature by supplying a relatively small electric power to the heater.

Hereinafter, preferred embodiments of the present disclosure will be described in detail. The present embodiments described below do not unduly limit the contents of the present disclosure described in the claims, and all the configurations described in the present embodiments are not always indispensable as solving means of the present disclosure.

1. First Embodiment

In FIG. 1, a pressure gauge 1A has an outer container 20 and an inner container 30 that are connected to a tube 10. The tube 10 is connected to a pipe or a vacuum chamber whose pressure is to be measured. The outer container 20 defines an outer chamber 21 that is set to a reference pressure (Pr). The outer chamber 21 is set to the reference pressure (Pr) of a high vacuum (for example, $10^{-5}$ Pa) by a getter pump 22. The outer container 20 is supported by an outer shell 50. A circuit board 24 can be disposed to the outer shell 50.

The inner container 30 is disposed in the outer container 20. The inner container 30 partitions the inner chamber into a first inner chamber 31 that is air-tightly partitioned from the outer chamber 21, and into a second inner chamber 32 that communicates with the outer chamber 21. The first inner chamber 31 is set to a measurement pressure (Px) as the first inner chamber 31 is allowed to communicate with the tube 10. The second inner chamber 32 is set to the reference pressure (Pr) in the same manner as the outer chamber 21, as the second inner chamber 32 communicates with the outer chamber 21.

Details of the inner container 30 will be described with reference to FIG. 2. The inner container 30 includes at least a cylindrical rigid wall portion 33 and first and second pressure receiving plates 34A, 34B in order to partition the inner chamber. The first and the second pressure receiving plates 34A, 34B are formed as opposing wall portions of the inner container 30. The first and the second pressure receiving plates 34A, 34B are displaced by a differential pressure between the reference pressure (Pr) and the measurement pressure (Px). The inner container 30 includes a bellows 38 that partitions the inner chamber surrounded by the cylindrical rigid wall portion 33 and the first and the second pressure receiving plates 34A, 34B into the first inner chamber 31 and into the second inner chamber 32. The bellows 38 is deformable so as to allow displacements of the first and the second pressure receiving plates 34A, 34B.

The inner container 30 includes a pressure detection element 39 disposed in the second inner chamber 32 so as to detect the measurement pressure (Px) based on the displacements of the first and the second pressure receiving plates 34A, 34B. The pressure detection element 39 may be of any type as long as this detects the measurement pressure (Px) based on the displacements of the first and the second pressure receiving plates 34A, 34B. The pressure detection element 39 can be a piezoelectric element. As the piezoelectric element, preferably a crystal resonator, and more preferably a double tuning fork crystal resonator can be used. Wirings 23A, 23B are connected to the pressure detection element 39, and these wirings 23A, 23B are further connected to the circuit board 24.

According to the present embodiment, the outer chamber 21 and the second inner chamber 32 both set to the reference pressure (Pr) are also used as a vacuum heat insulating part with a high vacuum, and convective heat transfer is suppressed by the vacuum heat insulation, whereby it is possible to reduce influence due to the temperature change which is the largest factor of errors of the pressure gauge 1A. In particular, a thermal time constant by the vacuum insulation is very large. Hence, it is not necessary to provide a thermostatic oven, and errors due to thermal transpiration do not occur. The reference pressure (Pr) can be a high vacuum of $\frac{1}{1000}$ or less, more preferably a high vacuum of $\frac{1}{10000}$ or less of a lower limit of the measurement pressure (Px). With this configuration, the pressure measurement can be performed with a high accuracy of 0.1% or less without being influenced by the reference pressure (Pr), and the function as the vacuum heat insulating part by the reference pressure (Pr) can be further enhanced.

At the time of pressure measurement, the first inner chamber 31 is set to the measurement pressure (Px) through the tube 10. As a result, as the differential pressure between the reference pressure (Pr) and the measurement pressure (Px) changes, the first and the second pressure receiving plates 34A, 34B are both displaced, accordingly. At that time, the bellows 38 is elastically deformed in accordance with the displacements of the first and the second pressure receiving plates 34A, 34B, to thereby secure free displacements of the first and the second pressure receiving plates 34A, 34B. Since the peripheries of the first and the second pressure receiving plates 34A, 34B are fixed to the rigid wall portion 33 side, the center portions thereof are displaced. Based on the displacements of the first and the second pressure receiving plates 34A, 34B, the measurement pressure (Pr) is detected by the pressure detection element 39 as is known. In particular, when the pressure detection element 39 is a crystal resonator or a double tuning fork type crystal resonator, the displacements of the first and the second pressure receiving plates 34A, 34B are detected as change in frequency of the crystal resonator, and the output signal in proportion to the measurement pressure (Pr) is obtained. At this time, since the displacements of the first and the second pressure receiving plates 34A, 34B have the equal absolute value and of opposite sign, the sensitivity becomes doubled even if individual displacements thereof are as small as 7 μm to 10 μm, for example. Thus, since the first and the second pressure receiving plates 34A, 34B each have a small amount of displacement, only a relatively small area is required for each of them, and the pressure gauge 1A is downsized depending on the areas of the pressure receiving plates 34A, 34B.

Even when the pressure gauge 1A is mounted with the first and the second pressure receiving plates 34A, 34B in horizontal postures, the first and the second pressure receiving plates 34A, 34B bend in the same direction due to their own weights; therefore, the displacements due to their own weights are canceled, and thus do not cause measurement errors. Moreover, each of the own weights of the first and the second pressure receiving plates 34A, 34B having relatively small areas are as light as several grams. In addition, even in the case of introducing the film forming gas into the first inner chamber 31 and setting the measurement pressure (Px), since the first and the second pressure plates 34A, 34B are equally formed with the films, the displacements caused by the change of the own weights of the first and the second pressure receiving plates 34A, 34B due to the film formation are canceled and thus do not cause measurement errors. In addition, since the first and the second pressure receiving plates 34A, 34B each having a small amount of displacement can be formed relatively thick, it is possible to suppress warping of the first and the second pressure receiving plates 34A, 34B also by internal stress due to the film formation. Accordingly, erroneous measurement resulting from the warping of the first and the second pressure receiving plates 34A, 34B can also be prevented.

In the present embodiment, a first rigid body portion 35A that connects the first pressure receiving plate 34A to the bellows 38, and a second rigid body portion 35B that connects the second pressure receiving plate 34B to the bellows 38 can further be provided. In this case, one end of the pressure detection element 39 is fixed to the first rigid body portion 35A, and the other end of the pressure detection element 39 is fixed to the second rigid body portion 35B. Further, each of the first and the second rigid body portions 35A, 35B can have an opening 36 that allows the second inner chamber 32 and the outer chamber 21 to communicate with each other, as illustrated in FIG. 2. With this configuration, since the bellows 38 is connected to the first and the second pressure receiving plates 34A, 34B via the first and the second rigid body portions 35A, 35B, assemblability of the pressure gauge 1A is improved, compared with the case of directly connecting the bellows 38 to the first and the second pressure receiving plates 34A, 34B. Moreover, the second inner chamber 32 in the bellows 38 and the outer chamber 21 in the outer container 20 are allowed to communicate with each other through the openings 36 formed respectively in the first and the second rigid body portions 35A, 35B, to thereby set the insides of the both chambers 21, 32 to the reference pressure (Pr).

Figure 2:
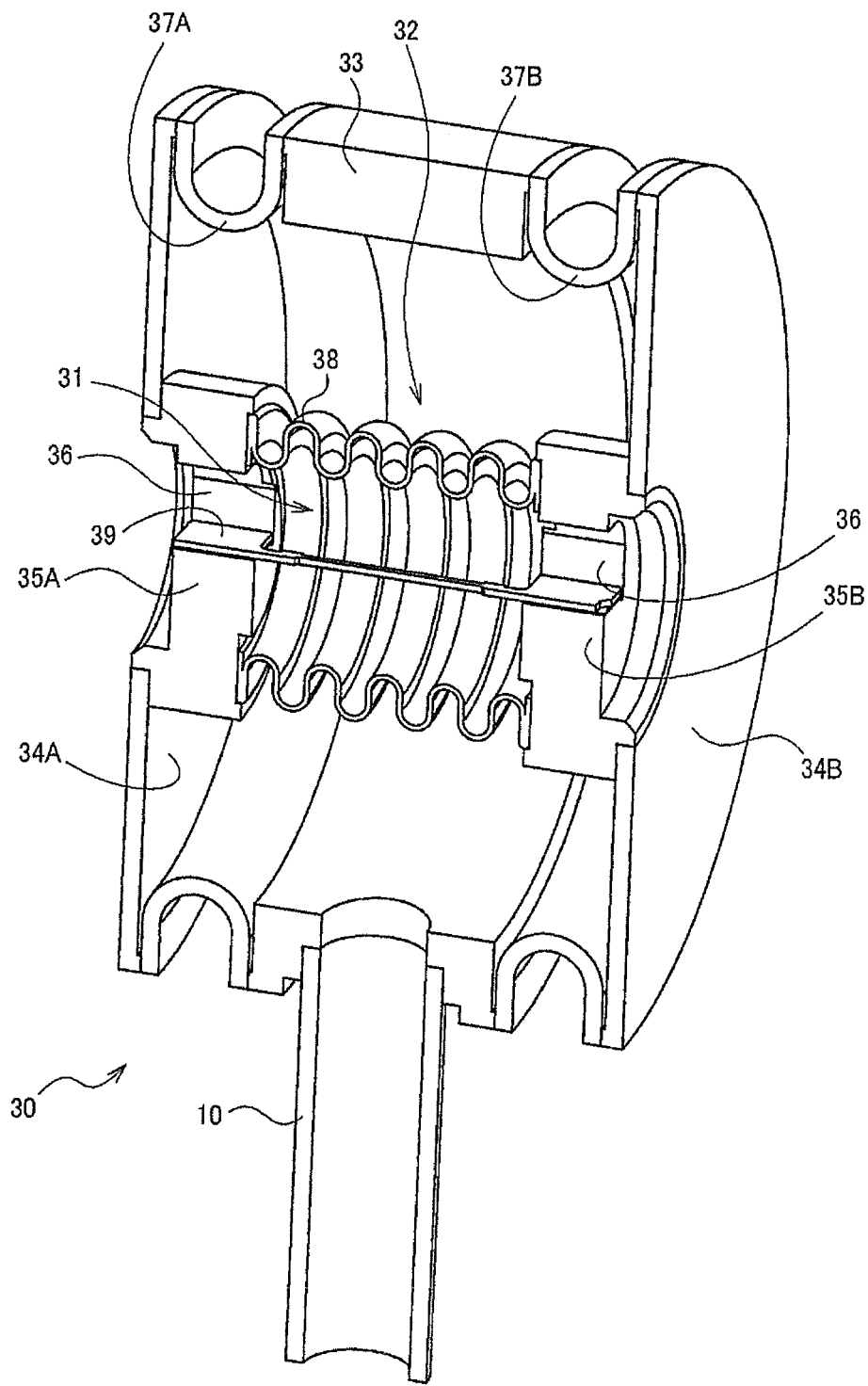
FIG. 2 is a perspective sectional view of an inner container of the pressure gauge illustrated in FIG. 1.

In the present embodiment, as illustrated in FIG. 2, one end of the pressure detection element 39 may be fixed to the opening 36 of the first rigid body portion 35A, and the other end of the pressure detection element 39 may be fixed to the opening 36 of the second rigid body portion 35B. Thus, since the pressure detection element 39 is fixed to the respective openings 36 of the first and the second rigid body portions 35A, 35B, the assemblability of the pressure gauge 1A is improved, compared with the case of directly fixing the pressure detection element 39 to the first and the second pressure receiving plates 34A, 34B. Further, in order to set the reference pressure (Pr), flat surfaces of the openings 36 formed in the first and the second rigid body portions 35A, 35B are used to facilitate coupling of the both ends of the pressure detection element 39 to the first and the second rigid body portions 35A, 35B.

Figure 3:
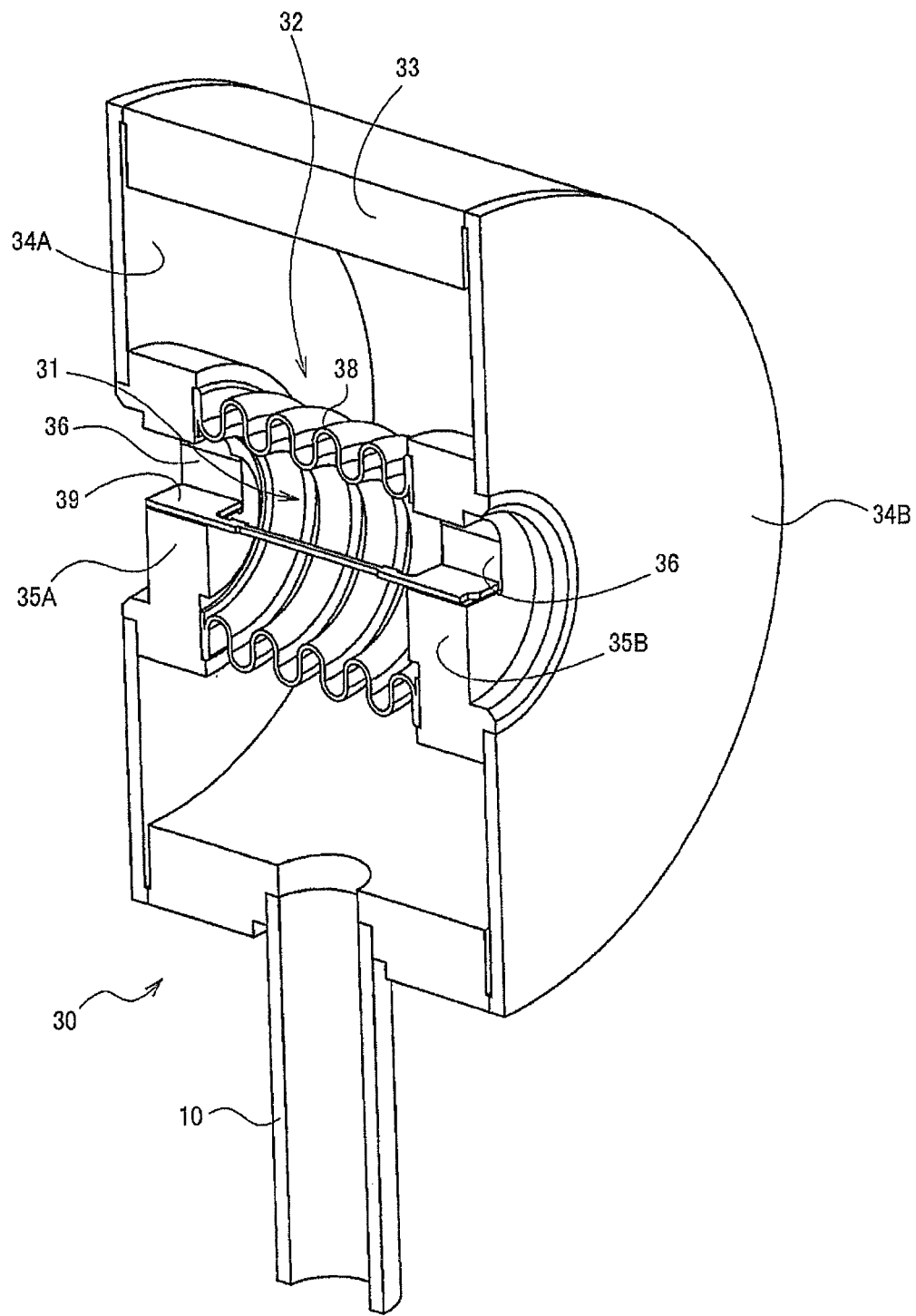
FIG. 3 is a perspective sectional view of the inner container without a first connecting member and a second connecting member.

In the present embodiment, there may be provided elastically deformable first and second connecting members 37A, 37B that air-tightly connect the first and the second pressure receiving plates 34A, 34B to the rigid wall portion 33. Thus, the free displacements at the centers of the first and the second pressure receiving plates 34A, 34B based on the differential pressure between the reference pressure (Pr) and the measurement pressure (Px) can be secured also at the peripheries of the first and the second pressure receiving plates 34A, 34B through the elastic deformations of the first and the second connecting members 37A, 37B. In particular, in the case in which the areas of the first and the second pressure receiving plates 34A, 34B are small, it is useful to provide the first and the second connecting members 37A, 37B. However, in the case in which the areas of the first and the second pressure receiving plates 34A, 34B are relatively large, the free displacements at the centers of the first and the second pressure receiving plates 34A, 34B can be ensured without displacing the peripheries of the first and the second pressure receiving plates 34A, 34B. Therefore, in this case, as illustrated in FIG. 3, it is unnecessary to provide the first and the second connecting members 37A, 37B. In fact, the first and the second connecting members 37A, 37B are necessary when the diameter of each of the first and the second pressure receiving plates 34A, 34B is 15 mm, but the first and the second connecting members 37A, 37B are unnecessary when the diameter of each of the first and second pressure receiving plates 34A, 34B is 25 mm.

The elastic coefficient of each of the first and the second connecting members 37A, 37B can be larger than the elastic coefficient of the bellows 38. That is, the first and the second connecting members 37A, 37B are harder to deform than the bellows 38 is. The bellows 38 expands and contracts in accordance with the free displacements of the first and the second pressure receiving plates 34A, 34B based on the differential pressure between the reference pressure (Pr) and the measurement pressure (Px); thus, the bellows 38 may have a sufficiently smaller elastic coefficient than those of the first and the second connecting members 37A, 37B.

Each of the first and the second connecting members 37A, 37B can be formed to be a ring-shaped member having a U-shaped cross section as illustrated in FIG. 2. Each of the first and the second connecting members 37A, 37B only needs to have a smaller displacement than the maximum displacement of each of the first and the second pressure receiving plates 34A, 34B, and has a relatively large elastic coefficient. Therefore, each of the first and the second connecting members 37A, 37B may be formed to have a single wave-shaped cross section of multiple waves of the cross section of the general bellows 38, that is, may be formed to be a ring-shaped member having a U-shaped cross section, as illustrated in FIG. 2. Thereby, the pressure gauge 1A can be reduced in size.

In the present embodiment, if the pressure detection element 39 is a piezoelectric element including a crystal resonator, it is preferable that a tensile force acts on the piezoelectric element 39 when the measurement pressure (Px) is at the lower limit. As with the case in which the measurement pressure (Px) is at the lower limit, as the differential pressure between the reference pressure (Pr) and the measurement pressure (Px) becomes relatively smaller, an external pressure acting on the piezoelectric element 39 becomes smaller. Then, the displacement of the piezoelectric element 39 due to the own weight of the bellows 38 or the like is likely to occur. If a tensile force acts on the piezoelectric element 39 when the measurement pressure (Px) is at the lower limit, the piezoelectric element 39 can be prevented from being displaced by its own weight, thus preventing measurement errors due to this displacement. In order to apply a tensile force to the piezoelectric element 39 when the measurement pressure (Px) is at the lower limit, for example, at the time of assembling the pressure gauge 1A having the outer chamber 21, the first inner chamber 31, and the second inner chamber 32 that are all set to the atmospheric pressure, the pressure detection element 39 may be fixed to the first and the second pressure receiving plates 34A, 34 or the first and the second rigid body portions 35A, 35B while a tensile force of about 5N is applied thereto, for example. The first and the second rigid body portions 35A, 35B are heavier than the bellows 38, but are located close to the first and the second pressure receiving plates 34A, 34B; thus, they receive less influence by their own weights than the bellows 38 does. In addition, in the case in which the pressure detection element 39 is formed of a crystal resonator, the pressure detection element 39 is extremely lightweight, and thus the influence by its own weight can be ignored.

Figure 4:
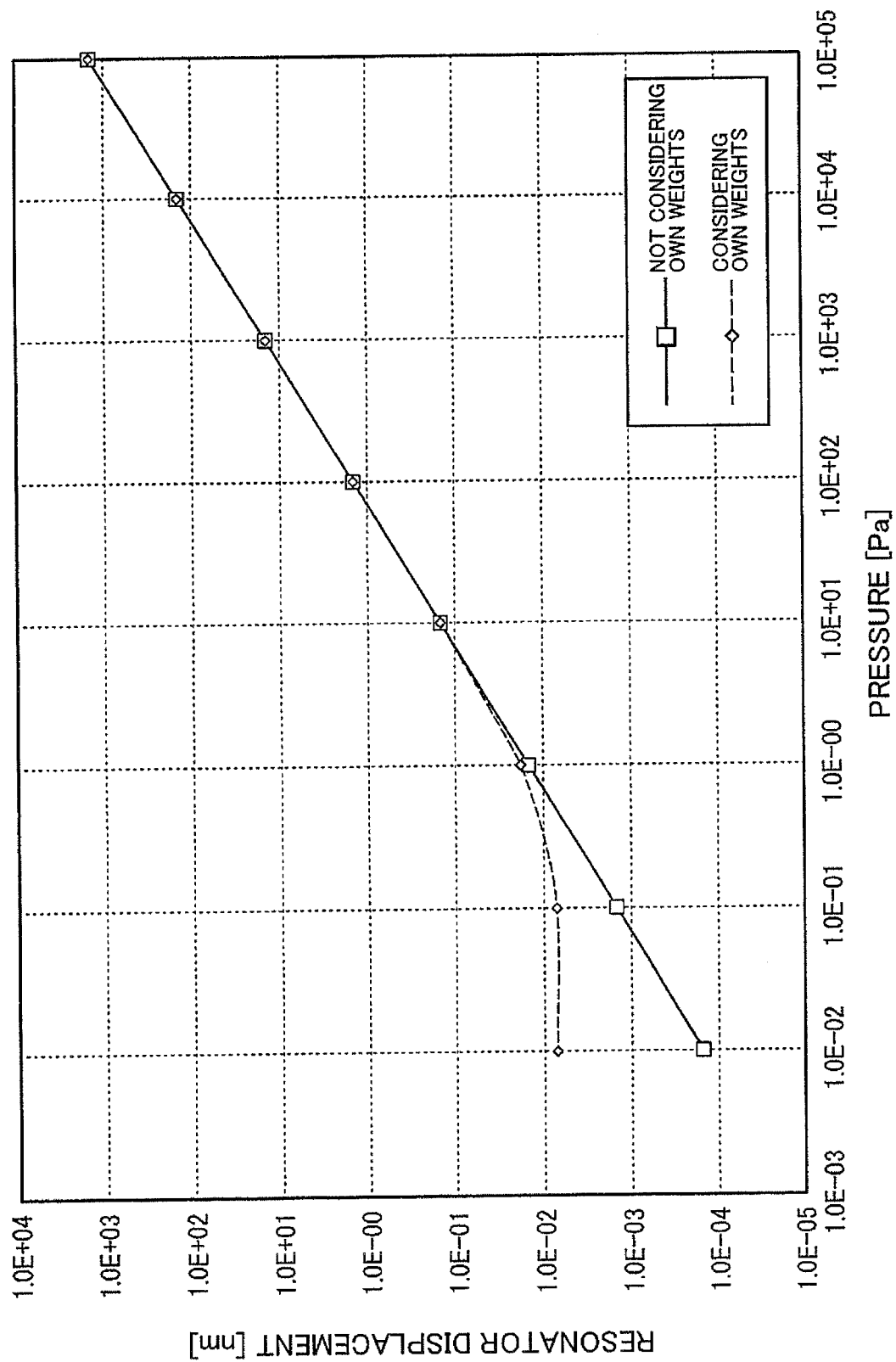
FIG. 4 is a diagram illustrating respective displacements of a pressure detection element relative to a measurement pressure when the own weights of the pressure detection element and a member supporting this element are considered and when the own weights thereof are not considered.

FIG. 4 illustrates respective displacements of the pressure detection element 39 relative to the change in the measurement pressure (Px) when not considering the own weight of the bellows 38 or the like and when considering the own weight thereof. When the measurement pressure is approximately 1 Pa or more, the displacement of the pressure detection element 39 changes linearly in accordance with the change in the measurement pressure (Px) regardless of whether or not the own weight is considered. However, if considering the own weight, when the measurement pressure is lower than approximately 1 Pa, the change in displacement of the pressure detection element 39 becomes small even if the pressure decreases. This is because, as the differential pressure between the reference pressure (Pr) and the measurement pressure (Px) becomes smaller, the external force (tensile force) acting on the pressure detection element 39 decreases, so that influence by the own weight of the bellows 38 and the like occurs.

Figure 5:
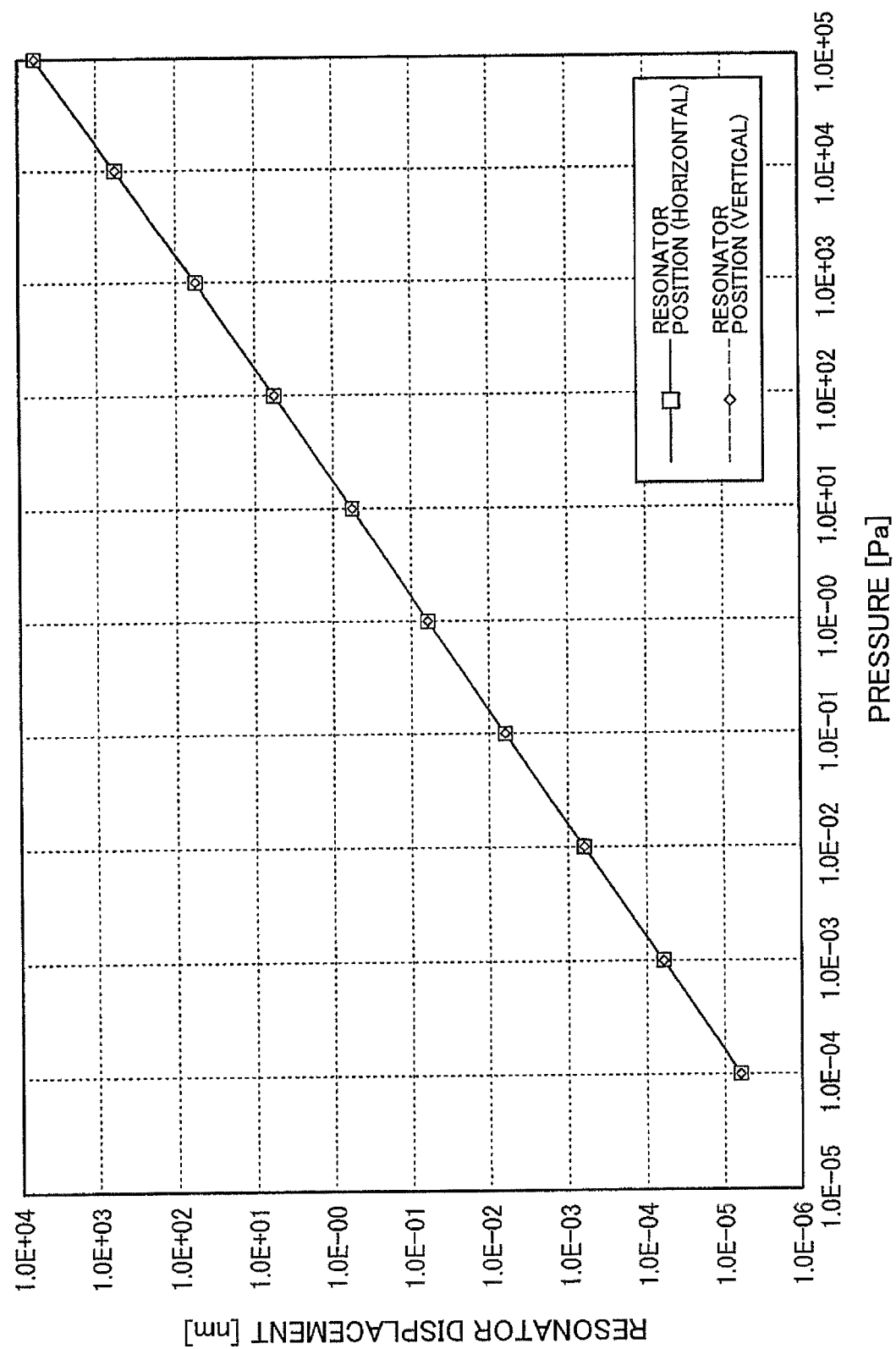
FIG. 5 is a diagram illustrating respective displacements of the pressure detection element in accordance with change in measurement pressure when the posture of the pressure detection element in state of the pressure gauge mounted is vertical and when the posture of the pressure detection element in state of the pressure gauge mounted is horizontal.
Figure 6:
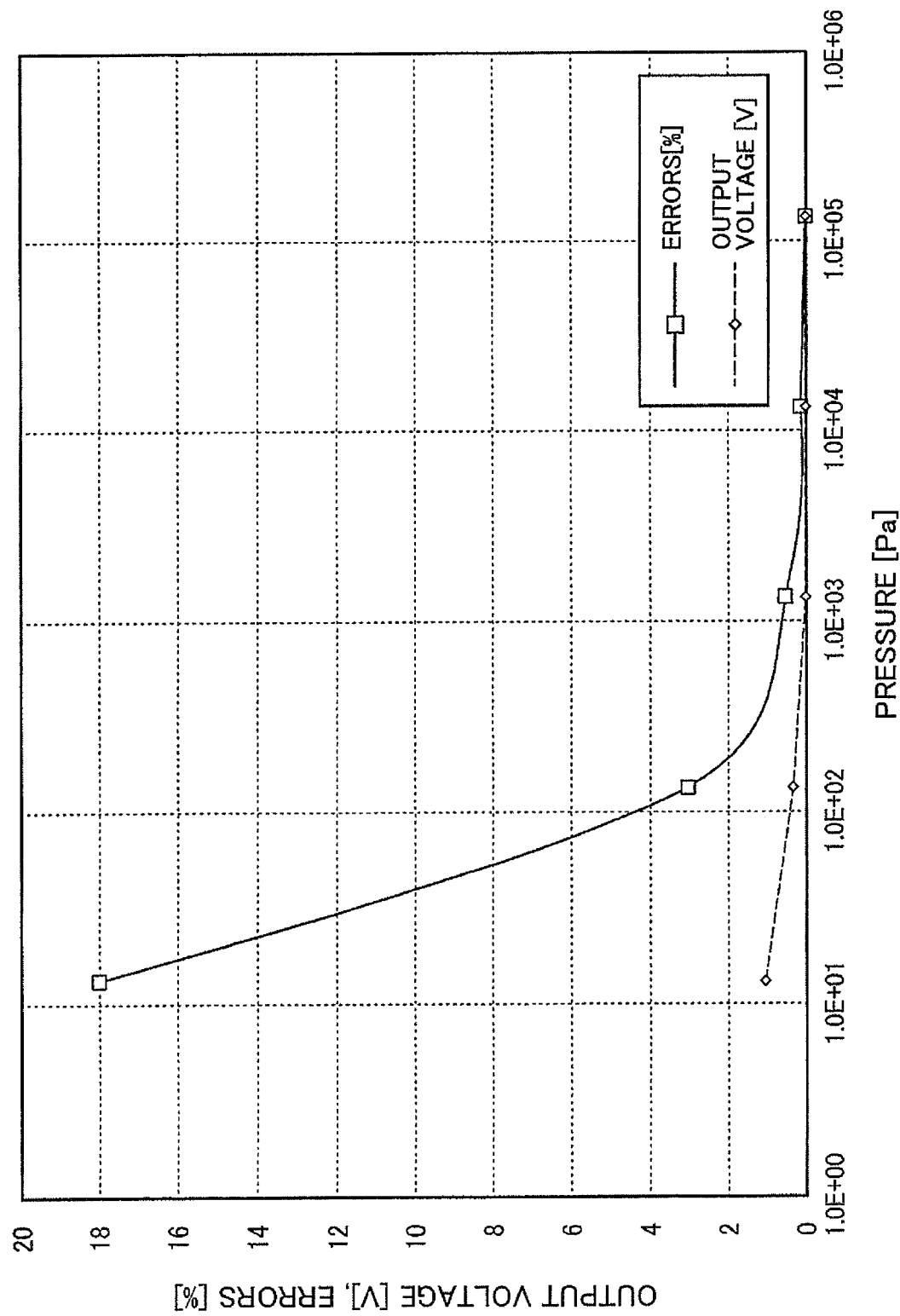
FIG. 6 is a diagram illustrating errors due to a difference between the vertical and horizontal postures of the pressure detection element without a preload of a conventional diaphragm pressure gauge.

In FIG. 4, considering the own weight of the bellows 38 and the like, when external force acting on the first and the second pressure receiving plates 34A, 34B is small, the displacement of the pressure detection element 39 changes nonlinearly relative to the change in the measurement pressure (Px). As a method of improving the non-linear characteristics to be linear characteristics without considering the own weight, a preload tensile force is applied to the pressure detection element 39 at the measurement pressure (Px) of 1 Pa or less. FIG. 5, in which the measurement is performed by adopting this method, illustrates the displacements of the pressure detection element 39 in accordance with the change in the measurement pressures (Px) when the posture of the pressure detection element 39 in state of the pressure gauge 1A mounted is vertical and when the posture of the pressure detection element 39 in state of the pressure gauge 1A mounted is horizontal. In FIG. 5, regardless of whether the posture of the pressure detection element 39 is vertical or horizontal, the displacement of the pressure detection element 39 changes linearly in accordance with the change in the measurement pressure (Px). Therefore, FIG. 5 with a preload is the same as FIG. 4 without considering the own weight of the bellows 38 or the like, and thus the displacement of the pressure detection element 39 can be changed linearly in accordance with the change in the measurement pressure (Px). FIG. 6 illustrates errors due to the difference between the vertical and the horizontal mounting postures of a conventional diaphragm pressure gauge in terms of the output voltage (V) and the percentage (%). When the pressure gauge, which is calibrated with the diaphragm vertically mounted before shipment, is rotated by 90 degrees so that the diaphragm is mounted in a horizontal state, the displacement of the diaphragm due to its own weight overlaps with the displacement due to the differential pressure between the reference pressure (Pr) and the measurement pressure (Px). As illustrated in FIG. 6, this situation becomes more remarkable as the differential pressure between the reference pressure (Pr) and the measurement pressure (Px) becomes smaller.

Figure 7:
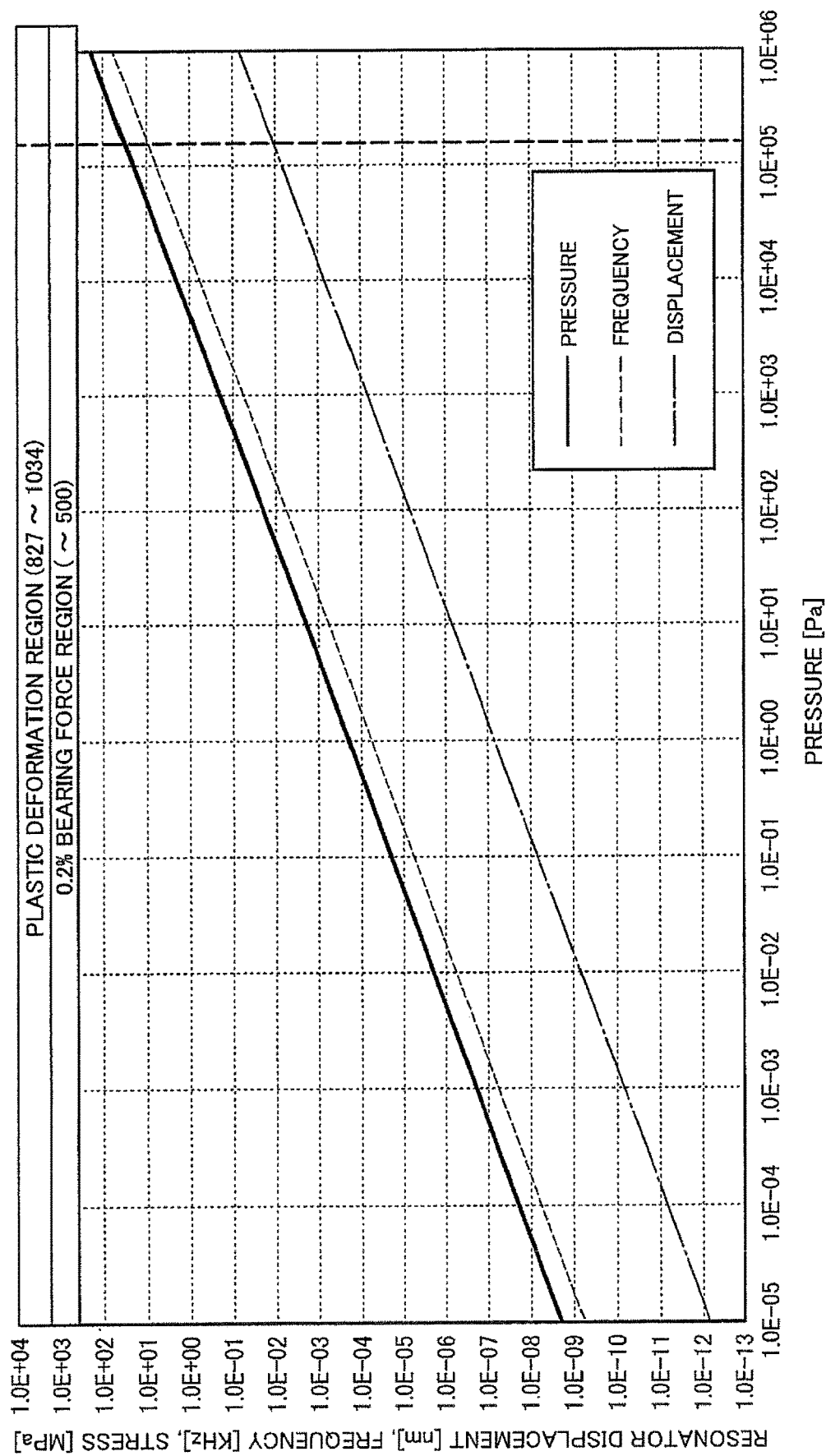
FIG. 7 is a diagram illustrating linear characteristics in a wide pressure measurement range of the pressure gauge according to the first embodiment of the present disclosure.

According to the pressure gauge 1A of the present embodiment, by detecting the pressure with the pressure detection element 39 having a preload based on the displacements of the first and the second pressure receiving plates 34A, 34B, the pressure-displacement characteristics, and the pressure-frequency characteristics, and the pressure-stress characteristics become linear over a wide pressure range from the atmospheric pressure (about $10^{+5}$ Pa) to $10^{-5}$ Pa, as illustrated in FIG. 7. Therefore, it is possible to increase versatility that the measurement can be performed over a wide pressure range with a single pressure gauge 1A. Although the measurement can be performed over a wide pressure range with the single pressure gauge 1A, the displacements of the first and the second pressure receiving plates 34A, 34B at the atmospheric pressure are as small as about 10 µM, the stress is 20 MPa or less, and this value corresponds to ⅕₀ of a stress in the plastic deformation region of the material of the first and the second pressure receiving plates 34A, 34B, and secular change and zero point drift very unlikely occur. In the present embodiment, when the reference pressure (Pr) is set to $10^{-5}$ Pa, for example, the measurement can be performed with the single pressure gauge 1A with a high accuracy over a 7-digit pressure range from $10^{-2}$ to $10^{+5}$ (atmospheric pressure). If the accuracy is lowered, a further wider pressure range can be measured with the single pressure gauge 1A.

2. Second Embodiment

Figure 8:
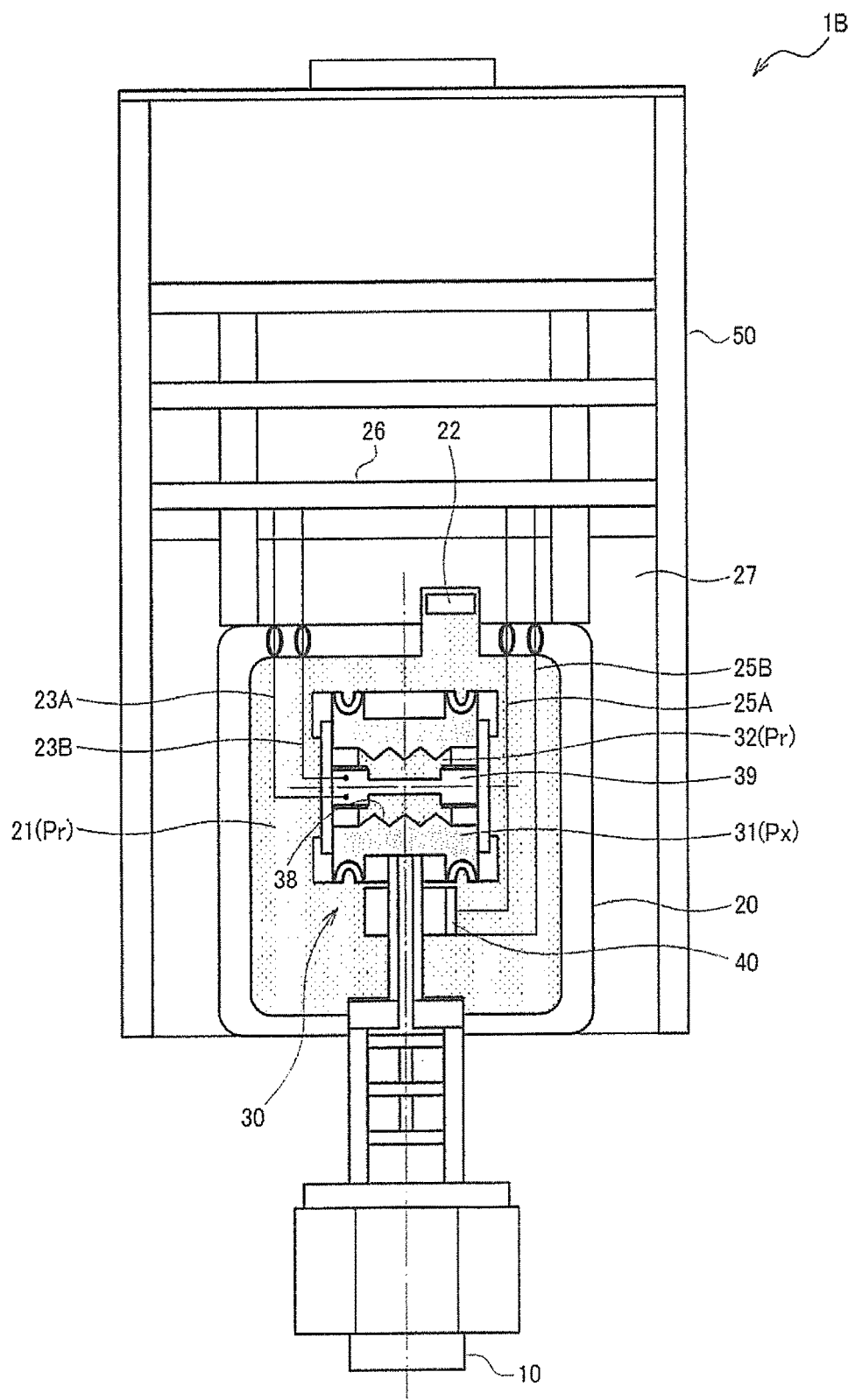
FIG. 8 is a sectional view of a pressure gauge according to a second embodiment of the present disclosure.

FIG. 8 illustrates a pressure gauge 1B according to the second embodiment of the present disclosure. The pressure gauge 1B illustrated in FIG. 8 can include the tube 10 disposed in the outer container 20 and a heater 40 on one side of the inner container 30. The heater 40 can heat the tube and the inner container 30. With this configuration, for example, in the case in which a film forming gas is introduced and the measurement pressure (Px) is set, the temperatures of the tube and the inner container 30 can be increased to a temperature at which deposition of the film forming gas is suppressed. Thereby, even if contacting with film forming gas, adhesion of the film forming gas to the inner container 30 etc., can be controlled. In particular, the inner container 30 that is vacuum insulated at the reference pressure (Pr) in the outer container 20 can be increased in temperature by supplying a relatively small electric power to the heater 40.

In FIG. 8, the outer shell 50 is further provided around the outer container 20. A circuit board 26 is supported by the outer shell 50. The wirings 23A, 23B of the pressure detection element 39 and the wirings 25A, 25B of the heater 40 are connected to the circuit board 26 supported by the outer shell 50. A heat insulating material 27 can be provided between the outer container 20 and the outer shell 50. In this way, heat from the heater 40 is prevented from being transferred to the outer shell 50 via the outer container 20.

In the pressure gauge 1B illustrated in FIG. 8, for example, in order to increase the temperature from the ordinary temperature to 200° C., only a short temperature-increasing time of 2500 seconds and a small power of 5 W are required, and the temperature of 200° C. can be maintained with only a low power of 1 W. Compared with the case of having no vacuum insulation, the power at the temperature increasing time is ⅕, the temperature increasing time is about ⅓, and the power during maintaining the temperature is ⅟₁₈.

Although the present embodiment has been described in detail as described above, it will be easily understood by those skilled in the art that many modifications can be made substantially without departing from the novel matters and effects of the present disclosure. Accordingly, all such modifications are intended to be included in the scope of the present disclosure. For example, a term described at least once together with a different term having a broader meaning or the same meaning in the specification or the drawings can be replaced with the different term in any part of the specification or the drawings. All combinations of the present embodiment and the modifications are also included in the scope of the present disclosure.

What is claimed is:

1. A pressure gauge comprising:
   an outer container defining an outer chamber set to a reference pressure;
   an inner container partitioning an inner chamber disposed in the outer container into a first inner chamber air-tightly partitioned from the outer chamber and into a second inner chamber communicating with the outer chamber; and
   a tube setting the first inner chamber to a measurement pressure,
   wherein the inner chamber includes
      a cylindrical rigid wall portion,
      first and second pressure receiving plates formed as opposing wall portions of the inner container and displaced due to a differential pressure between the reference pressure and the measurement pressure,
      a bellows disposed in the inner chamber surrounded by the cylindrical rigid wall portion and the first and the second pressure receiving plates so as to partition the inner chamber into the first inner chamber and into the second inner chamber, the bellows being deformable to allow displacements of the first and the second pressure plates, and
      a pressure detection element disposed in the second inner chamber and detecting the measurement pressure based on the displacements of the first and the second pressure receiving plates, and
   wherein the outer chamber and the second inner chamber are set to the reference pressure of a vacuum that is lower than a lower limit of the measurement pressure.

2. The pressure gauge according to claim 1, further comprising:
   a first rigid body portion that connects the first pressure receiving plate to the bellows; and
   a second rigid body portion that connects the second pressure receiving plate to the bellows,
   wherein one end of the pressure detection element is fixed to the first rigid body portion and the other end of the pressure detection element is fixed to the second rigid body portion, and
   wherein each of the first and the second rigid body portions has an opening that allows the second inner chamber to communicate with the outer chamber.

3. The pressure gauge according to claim 2, wherein the one end of the pressure detection element is fixed to the opening of the first rigid body portion, and the other end of the pressure detection element is fixed to the opening of the second rigid body portion.

4. The pressure gauge according to claim 1, wherein the pressure detection element is a piezoelectric element.

5. The pressure gauge according to claim 4, wherein a tensile force acts on the piezoelectric element when the measurement pressure is at the lower limit.

6. The pressure gauge according to claim 1, further comprising elastically deformable first and second connecting members that air-tightly connect the first and the second pressure receiving plates to the rigid wall portion.

7. The pressure gauge according to claim 6, wherein an elastic coefficient of each of the first and the second connecting members is larger than an elastic coefficient of the bellows.

8. The pressure gauge according to claim 7, wherein each of the first and the second connecting members has a ring-shaped member having a U-shaped cross section.

9. The pressure gauge according to claim 1, wherein the reference pressure is ⅟₁₀₀₀₀ or less of a lower limit of the measurement pressure.

10. The pressure gauge according to claim 1, wherein one of the tube and the inner container that are disposed in the outer container is provided with a heater.

* * * * *